Feb. 16, 1960
P. PANHARD
2,924,954
UNIVERSAL JOINTS IN PARTICULAR FOR
AUTOMOBILE VEHICLE TRANSMISSIONS
Filed Nov. 7, 1958
3 Sheets-Sheet 1
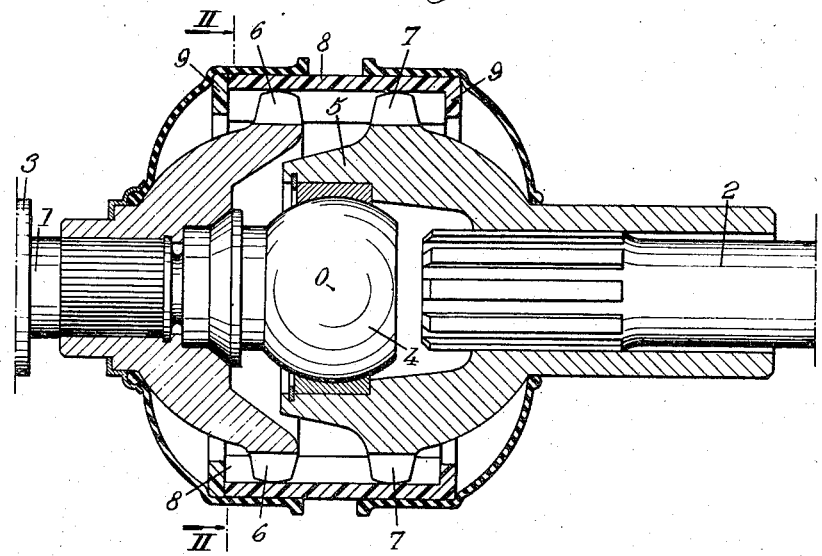
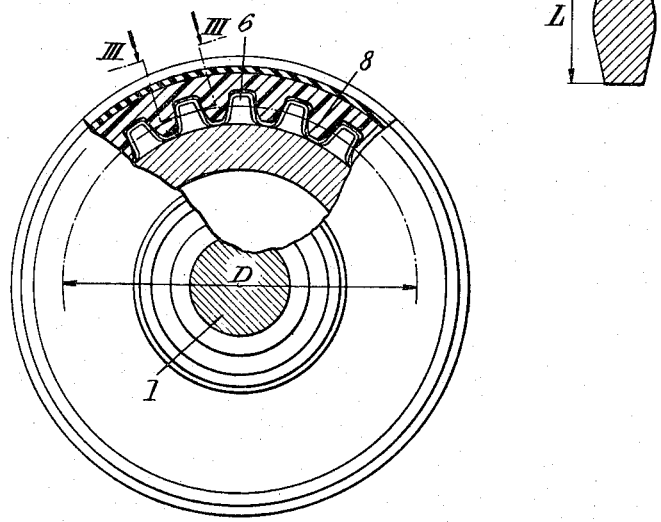

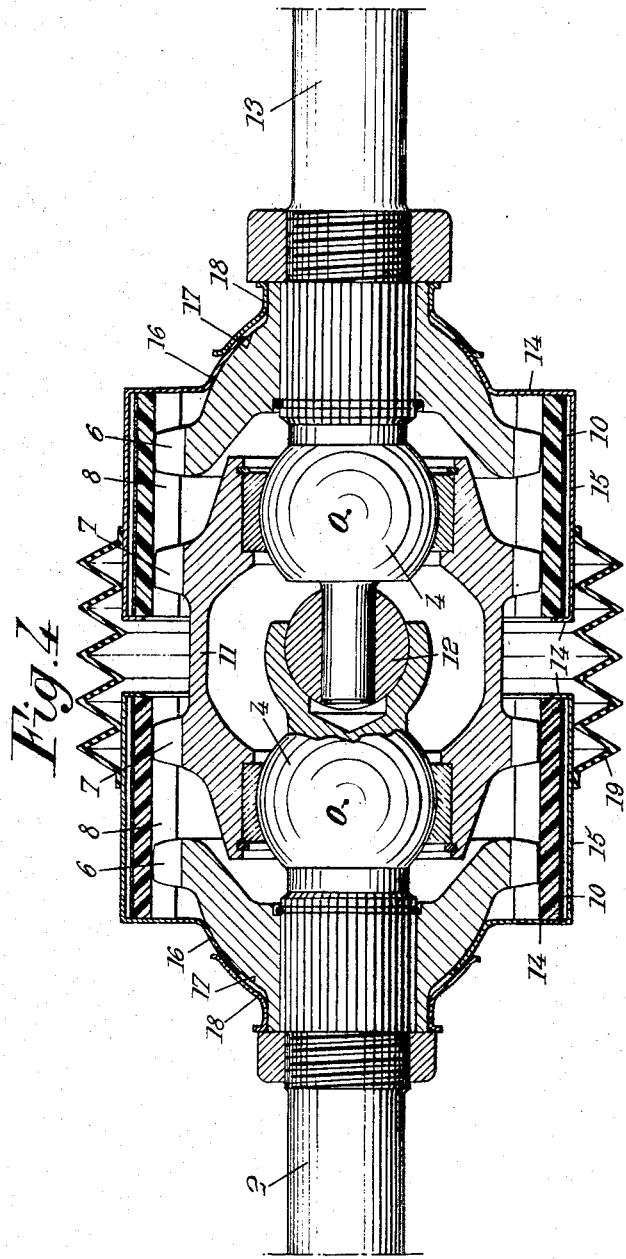

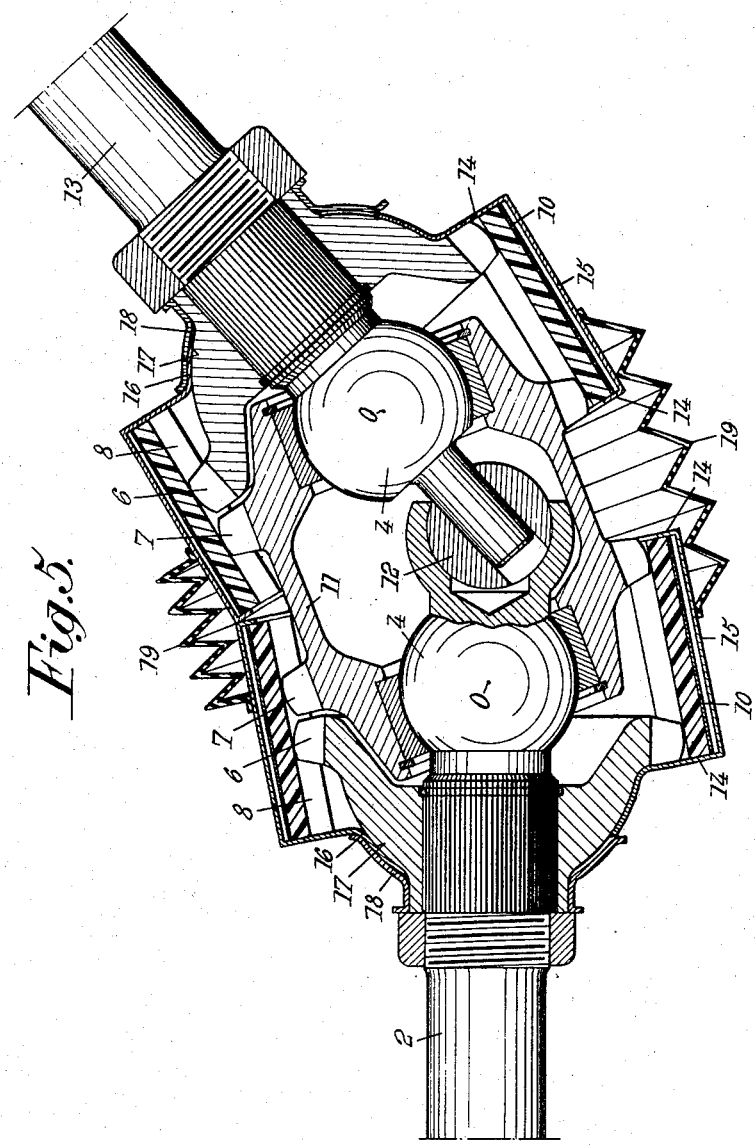

United States Patent Office 2,924,954
Patented Feb. 16, 1960

2,924,954

UNIVERSAL JOINTS IN PARTICULAR FOR AUTOMOBILE VEHICLE TRANSMISSIONS

Paul Panhard, Paris, France, assignor to Societe Anonyme des Anciens Etablissements Panhard & Levassor, Paris, France, a French society Application November 7, 1958, Serial No. 772,607

Claims priority, application France November 27, 1957

9 Claims. (Cl. 64—9)

The present invention relates to universal joints, this term being intended to mean joints for transmitting power between two shaft elements the relative angular displacements of which may be at least equal to 12°, as opposed to joints merely intended to permit slight misalignment of shaft elements which are theoretically substantially coaxial.

The invention is more especially concerned with universal joints for use in automobile vehicles and in particular automobile vehicles of the front drive type.

It has already been suggested to couple together two shaft elements liable to have some misalignment with respect to each other by means of a joint merely constituted by a sleeve having internal teeth engaging two toothed hub members rigid respectively with the adjacent ends of the two shafts. But such joints could not be used when the shaft elements were mounted to have substantial relative angular displacements with respect to each other. They could be used only when the two shaft elements to be coupled together were respectively guided at least approximately in alignment with each other.

The object of the present invention is to provide a joint of this kind which is a true universal joint.

Said invention consists chiefly, on the one hand in providing between the two shaft elements a swivel joint mounting causing the respective axes of said shaft elements constantly to have at least one point that is common to both of them, which means that said axes either are in coincidence with each other or intersect each other, and on the other hand in providing each shaft element near its end close to said swivel mounting with a toothed hub member, the two toothed hub members being engaged in a common sleeve, provided, opposite said toothed members, with internal teeth made of a plastic material having both a high mechanical resistance, in particular to bending stresses, shocks and wear and a resiliency sufficient to permit said relative angular displacements between the shaft elements.

Preferred embodiments of the present invention will be hereinafter described with reference to the accompanying drawings given merely by way of example and in which:

Figs. 1 and 2 show respectively, in axial sectional view and in end view with a portion in section on the line II—II of Fig. 1, a universal joint made according to the invention.

Fig. 3 is a separate view showing one of the teeth in cross section.

Figs. 4 and 5 show, in axial section and in two relative positions of the elements respectively, a universal joint made according to another embodiment of the invention.

The universal joint shown by Figs. 1 and 2 is intended to transmit power between two shaft elements 1 and 2, the first of which is the output shaft of the mechanism of a front drive transmission for an automobile vehicle, this shaft element 1 being guided by a bearing with respect to a casing 3, whereas the other shaft, 2, is the transverse shaft element of this transmission. These two shaft elements 1 and 2 may make angles of at least 12° with respect to each other.

Shaft elements 1 and 2 are provided with cooperating means for causing their respective axes, when they are not in coincidence with each other, constantly to intersect each other at a point 0 (center of the joint). Said means include a ball 4 carried by the free end of shaft element 1 and fitting in a spherical socket carried by a sleeve 5 slidable on shaft element 2.

Shaft elements 1 and 2 carry, on respective hub portions thereof and symmetrically with respect to point 0 when said shafts are in alignment with each other, respective spur gears 6 and 7 identical to each other and in particular having the same diameter and the same number of teeth (for instance 24). These teeth are of a general shape similar to that of conventional gear wheel teeth, but, as visible on Figs. 2 and 3, they are made of a depth that decreases from their middle plane of symmetry toward their sides. Preferably, the breadth L of the teeth (which advantageously ranges from 8 to 10 mm.) will be small as compared with the diameter D of the gear, $L/D$ being for instance equal to 1/8.

The two gears 6 and 7 are connected together by means of a sleeve 8 provided with internal teeth adapted tightly to engage the teeth of said gears 6 and 7. This sleeve 8, including its teeth, consists of a tubular piece made of a plastic material as will be hereinafter described.

Actually, as it is not a conventional meshing that takes place between the external and internal teeth, the shapes of these teeth need not be those of conventional toothed wheel teeth. However, advantageously there must be some taper or clearance of the teeth. A solution that has given particularly interesting results consists in making the teeth in such manner that they contact one another not along lines but over areas. These areas may for instance be flat and the flanks of the profiles may be inclined for each tooth at 15° with respect to the axial radial plane of the tooth that is considered.

Sleeve 8 is arranged in such manner that its internal teeth can be deformed where they cooperate with gears 6 and 7, so that, in each of the radial planes of said sleeve, the diameter measured at the bottom of the spaces between the teeth can, at least twice for every revolution, when the respective axes of shaft elements 1 and 2 make with each other a constant angle in a fixed plane, undergo a variation at least equal to 1/100 of said diameter.

Thus, the sleeve can, when the shaft elements make an angle with each other, be deformed by ovalisation without risks of injury to a much greater degree than could be found possible with a rigid metal piece.

The desired possibility of ovalizing will be easily obtained if sleeve 8 is made of a single piece of a plastic material and is free from any rigid stiffening part.

In order to prevent any detrimental displacements of sleeve 8 in the axial direction, it will suffice to provide it, along each of its edges, with an inward flange 9 made of the same material as the sleeve, as shown by Fig. 1. These flanges, which are themselves deformable, will not prevent deformations of the sleeve. One of the flanges may be fixed by glueing on the sleeve after said sleeve has been slipped on the two gears 6 and 7. When said gears 6 and 7 are inclined with respect to each other, the external side of the teeth of one of the gears will, if necessary, push back one of the flanges so as to ensure an axial centering of the sleeve.

If it is desired to have only an ovalizing deformation of sleeve 8, while excluding any radial expansion thereof, it will suffice to provide said sleeve with a non expansible resilient sheath (for instance of thin spring steel 0.2 mm.

thick) mounted as shown at 10 on Figs. 4 and 5 to surround sleeve 8.

Such a universal joint will always remain symmetrical with respect to the middle transverse plane of sleeve 8. Experience teaches that it permits angular relative displacements of the shaft elements higher than 12° and which may be as high as 20° and 25°, which is quite sufficient for the internal universal joint of a transmission for a front drive automobile.

If now, it is desired to obtain an angular displacement greater than 24° and possibly as high as 40° and even 45°, as it is of interest to have for the external universal joints of such transmission, use is made of a double joint which transmits a perfectly constant angular velocity as illustrated by Figs. 4 and 5.

In this construction, two universal joints similar to that shown by Figs. 1 and 2 are combined together by rigidly assembling together the two gears 7 of said elementary joints, so as thus to form an intermediate shaft element 11. Furthermore, a spherical ball and socket joint 12 is provided between the ends of shaft elements 2 and 13 (which shafts extend beyond their respective balls 4). The center of spherical ball 12 which is fixed with respect to shaft element 2 is movable along the axis of shaft element 13 owing to the sliding engagement of the end of said last mentioned shaft element in ball 12.

Figs. 4 and 5 show a modification of the means for keeping sleeve 8 axially in position. Instead of providing said sleeves with inward flanges such as that shown at 9 on Fig. 1, each sleeve 8 is mounted between annular end walls 14 belonging to a cylindrical casing 15 which surrounds the corresponding sleeve 8 so as to leave each of its parts free to move radially, whereas the sleeve is prevented from moving axially with respect to said casing 15. Each of said casings 15 carries, at its end adjoining the corresponding gear 6, a spherical cap portion 16 held between a spherical portion 17 of the corresponding toothed hub member 6 and a corresponding spherical cap fixed on said member.

The adjacent edges of casing 15 are advantageously connected together by protecting bellows 19.

Whatever be the construction that is chosen, sleeve 8 and their internal teeth should be made as a molded block of a plastic material (either homogeneous or heterogeneous) having both a high mechanical resistance in particular to bending stresses (of at least some kgs. per sq. mm.), to shocks (of at least a fraction of one kg. per sq. mm.), and to wear, and a resiliency which is sufficient although limited (with a modulus of elasticity ranging from 100 to 1,000 kg. per sq. mm.). Such a material may be a polyester, a polycarbonate or a superpolyamide in the form of a plastic mass, as sold under the trademarks of "nylon" or "Rilsan," or again a stratified substance consisting of a textile material and a thermo-setting resin, this resin being advantageously cellulose acetate or polystyrene.

As for toothed gears 6 and 7, they may be made of the same material as sleeve 8 or of an analogous material. But, they may also be made of aluminium bronze cast in a shell without any other finishing treatment than a burnishing of the teeth between toothed rollers. They might also be made of sintered metal.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A universal joint for transmitting power between two shaft elements the relative angular displacements of which may be at least equal to 12°, this universal joint comprising, in combination, cooperating swivel means mounted on said shaft elements respectively for causing the axes of said shaft elements constantly to have at least one point that is common to both of them, two toothed hub members carried by the adjacent ends of said shaft elements coaxially therewith so as to rotate together with said shaft elements, respectively, and a sleeve surrounding said ends of said shaft elements, said sleeve being provided with internal teeth in mesh with the teeth of said toothed members respectively, said sleeve being made of a plastic material having both a high mechanical resistance and a resiliency sufficient to enable said sleeve to undergo deformations permitting said relative angular displacements between said shaft elements.

2. A universal joint according to claim 1 in which the teeth of each of said toothed members are of a depth that decreases from the middle plane of the toothed member toward the sides thereof.

3. A universal joint according to claim 1 in which the internal teeth of said sleeve extend from one end thereof to the other, the whole of said sleeve and its teeth being made of a plastic material.

4. A universal joint according to claim 1 in which each of said sleeves includes inward flanges at the ends thereof, said flanges being adapted to cooperate with the corresponding sides of the respective teeth of said members for some relative positions of said elements.

5. A universal joint according to claim 1 which comprises a cylindrical casing surrounding said sleeve and swivelled to one of said shaft elements about a point of the axis thereof, said casing including inward flanges rigid therewith and arranged to cooperate with the ends of said sleeve so as to keep it in position.

6. A universal joint according to claim 1 in which the internal teeth of said sleeve extend from one end thereof to the other, the whole of said sleeve and its teeth being made of a plastic material and a non expansible flexible sheath tightly surrounding said first mentioned sleeve.

7. A universal joint for transmitting power between two shaft elements the relative displacements of which may be at least equal to 12°, this universal joint comprising, in combination, an intermediate cylindrical hollow shaft element interposed between said shaft elements, cooperating swivel means mounted on one of said two first mentioned shaft elements and on the end of said intermediate shaft element adjacent thereto, respectively, for causing the axes of the two last mentioned shaft elements constantly to have at least one point that is common to both of them, cooperating swivel means mounted on the other of said two first mentioned shaft elements and on the end of said intermediate shaft element adjacent thereto, respectively, for causing the axes of the two last mentioned shaft elements constantly to have at least one point that is common to both of them, two pairs of toothed hub members, the two toothed hub members of each of said pairs being rigid respectively with one of said two first mentioned shaft elements and with the end of said intermediate shaft element adjacent thereto two sleeves, each of said sleeves surrounding the end of one of said first mentioned shaft elements and the adjacent end of said intermediate shaft element, said sleeves being provided with internal teeth in mesh with the teeth of said toothed members located therein, each of said sleeves being made of a plastic material having both a high mechanical resistance and a resiliency sufficient to enable said sleeve to undergo deformations permitting said relative angular displacements between said shafts and cooperating swivelling and sliding means carried by the adjacent ends of said two first mentioned shaft elements to cause their respective axes to intersect constantly each other.

8. A universal joint according to claim 1 in which said plastic material has a modulus of elasticity ranging approximately from 100 to 1,000 kgs. per sq. mm. as is a substance of the group consisting of polyesters, polycarbonates and superpolyamides having a plastic mass consistency.

9. A universal joint according to claim 1 in which one of said two toothed hub members is rigid with the shaft element by which it is carried and the other of said two toothed hub members is slidable axially with respect to the shaft element by which it is carried.

References Cited in the file of this patent

UNITED STATES PATENTS

| 2,106,672 | Wollner | Jan. 25, 1938 |
| 2,186,846 | Trbojevich | Jan. 9, 1940 |
| 2,699,656 | Anderson et al. | Jan. 18, 1955 |
| 2,859,599 | Case | Nov. 11, 1958 |